(12) United States Patent
Okagawa et al.

(10) Patent No.: US 10,682,890 B2
(45) Date of Patent: Jun. 16, 2020

(54) TIRE

(71) Applicant: Sumitomo Rubber Industries, Ltd., Kobe-shi, Hyogo (JP)

(72) Inventors: Hiroshi Okagawa, Kobe (JP); Tomoyuki Kujime, Kobe (JP); Minoru Nishi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 215 days.

(21) Appl. No.: 15/714,394

(22) Filed: Sep. 25, 2017

(65) Prior Publication Data

US 2018/0086150 A1    Mar. 29, 2018

(30) Foreign Application Priority Data

Sep. 26, 2016   (JP) .................................. 2016-186913

(51) Int. Cl.
*B60C 11/04*   (2006.01)
*B60C 11/13*   (2006.01)
*B60C 11/03*   (2006.01)

(52) U.S. Cl.
CPC ...... *B60C 11/1307* (2013.01); *B60C 11/0304* (2013.01); *B60C 11/045* (2013.01); *B60C 2011/1338* (2013.01)

(58) Field of Classification Search
CPC .............................................. B60C 2011/1338
See application file for complete search history.

(56) References Cited

U.S. PATENT DOCUMENTS

| | | | |
|---|---|---|---|
| 2009/0145529 A1 | 6/2009 | Miyazaki | |
| 2009/0242090 A1 | 10/2009 | Ibaraki | |
| 2010/0180994 A1* | 7/2010 | Yamaguchi | B60C 11/01 152/153 |
| 2011/0308681 A1* | 12/2011 | Nakamura | B60C 11/032 152/209.18 |
| 2013/0068359 A1* | 3/2013 | Suita | B60C 11/01 152/209.16 |
| 2015/0158340 A1* | 6/2015 | Kaji | B60C 11/1307 152/209.21 |

FOREIGN PATENT DOCUMENTS

| | | | | |
|---|---|---|---|---|
| EP | 0602989 A1 * | 6/1994 | | B60C 11/0309 |
| EP | 2353886 A1 | 8/2011 | | |
| JP | 3-276802 A | 12/1991 | | |
| JP | 2006-111088 A | 4/2006 | | |
| JP | 2009-227222 A | 10/2009 | | |

OTHER PUBLICATIONS

Extended European Search Report for corresponding European Application No. 17191888.1, dated Mar. 8, 2018.

* cited by examiner

*Primary Examiner* — Alison L Hindenlang
*Assistant Examiner* — Shibin Liang
(74) *Attorney, Agent, or Firm* — Birch, Stewart, Kolasch & Birch, LLP

(57) ABSTRACT

A vehicle tire includes a tread portion provided in the tread surface with a circumferentially continuously extending groove having a bottom and a pair of opposite side walls, wherein at least one of the side walls is provided with protrusions protruding into the groove and arranged in the tire circumferential direction. The protrusion has a gradually increasing part in which the area of the cross section of the protrusion being parallel with the tread surface is gradually increased toward the radially outer side of the tire.

14 Claims, 6 Drawing Sheets

TIRE

TECHNICAL FIELD

The present invention relates to a tire improved in the drainage performance, noise performance and demolding performance.

BACKGROUND ART

Heretofore, there is known a tire which is provided with a circumferential groove extending continuously in the tire circumferential direction and provided in groove side walls with a plurality of radial grooves arranged along the longitudinal direction of the circumferential groove as disclosed in Japanese Patent Application Publication No. 2009-227222 (Patent Document 1). Such radial grooves likely cause turbulence to water flowing in the circumferential groove, and facilitate a separation of the water flow from the groove side walls of the circumferential groove. Further, the radial grooves acts as a resistance to air flowing in the circumferential groove, and reduce a resonance sound generated from an air tube formed by being surrounded by the circumferential groove and the road surface. Thus, the tire provided with the radial grooves has excellent drainage performance and noise performance.

However, when demolding the vulcanized tire from a vulcanization mold provided with protruding portions for forming the radial grooves, there is a possibility that the rubber of the side walls of the circumferential groove are damaged by being scratched or torn by the protruding portions.

SUMMARY OF THE INVENTION

It is therefor, an object of the present invention to provide a tire in which the drainage performance, noise performance and demolding performance can be improved by providing a groove side wall of a circumferential groove with protrusions arraigned in the longitudinal direction of the circumferential groove.

According to the present invention, a tire comprises:
a tread portion provided in the tread surface with a circumferentially continuously extending circumferential groove having a bottom and a pair of opposite side walls, wherein
at least one of the side walls is provided with protrusions protruding into the circumferential groove and arranged in the tire circumferential direction, and
each of the protrusions has a gradually increasing part in which the area of the cross section of the protrusion being parallel with the tread surface is gradually increased toward the radially outer side of the tire.

Further, the tire according to the present invention may have the following features (1)-(10):
(1) the protrusions include the protrusion whose cross section in parallel with the tread surface has a semicircular shape;
(2) the protrusions include the protrusion whose cross section in parallel with the tread surface has a triangular shape;
(3) in the cross section of each protrusion, the maximum amount of the protruding in the widthwise direction of the groove is greater than the maximum width in the tire circumferential direction;
(4) the radial distances from the tread surface to the radially outer ends of the protrusions are 6% to 36% of the depth of the circumferential groove;
(5) the radial distances from the groove bottom of the circumferential groove to the radially inner ends of the protrusions are 7% to 40% of the groove depth of the circumferential groove;
(6) the protrusions include a major protrusion having a radial length, and a minor protrusion whose radial length is smaller than the radial length of the major protrusion;
(7) on at least one side in the tire circumferential direction of the major protrusion, the minor protrusion is disposed adjacently thereto, and
on at least one side in the tire circumferential direction of the minor protrusion, the major protrusion is disposed adjacently thereto;
(8) the radial length of the major protrusion is 1.2 to 1.8 times the radial length of the minor protrusion;
(9) pitches of the protrusions in the tire circumferential direction are 1.5 to 4 times the maximum width in the tire circumferential direction of the protrusions;
(10) the maximum height of each of the protrusions measured in the normal direction to the groove side wall is 0.3 to 1.5 mm.

BRIEF DESCRIPTION OF THE DRAWINGS

FIG. 4($b$) is a cross sectional view of a protrusion taken along line B-B of FIG. 3.

DESCRIPTION OF THE PREFERRED EMBODIMENTS

The present invention can be applied to various tires such as pneumatic tires, non-pneumatic tires and solid tires for various vehicles such as passenger cars and heavy duty vehicles such as trucks and buses.

Taking a pneumatic tire for passenger cars as an example, embodiments of the present invention will now be described with reference to the accompanying drawings.

Figure 1:
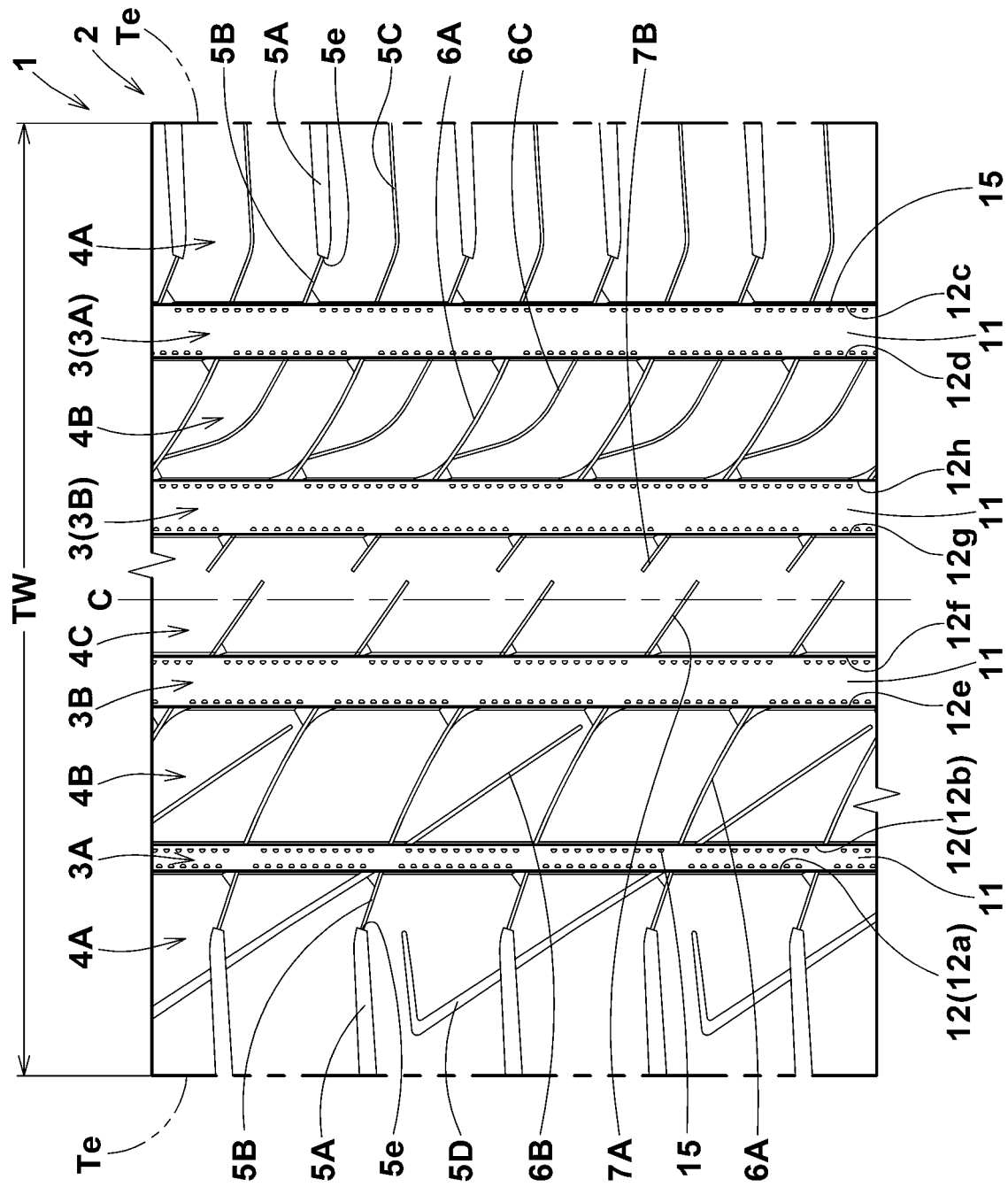
FIG. 1 is a developed partial view of the tread portion of a tire as an embodiment of the present invention.

FIG. 1 is a developed view of a part of a tread portion 2 of a pneumatic tire 1 as an embodiment of the present invention.

In the case of a pneumatic tire, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The undermentioned normally inflated loaded condition is such that the tire is mounted on the standard wheel rim and inflated to the standard pressure and loaded with the standard tire load. The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The tread edges Te are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges Te determined as above.

According to the present invention, the tread portion 2 is provided with at least one circumferential groove 3 extending continuously in the tire circumferential direction.

In the present embodiment, the above-said at least one circumferential groove 3 is a pair of axially outermost shoulder circumferential grooves 3A, and a pair of crown circumferential grooves 3B disposed one on each side of the tire equator C. Accordingly, the tread portion 2 is axially divided into a pair of shoulder land portions 4A between the shoulder circumferential grooves 3A and the tread edges Te, a pair of middle land portions 4B between the shoulder circumferential grooves 3A and the crown circumferential grooves 3B, and a crown land portion 4C between the crown circumferential grooves 3B.

The shoulder land portions 4A are each provided with
shoulder lug grooves 5A extending axially inwardly from the tread edge Te and terminating within the shoulder land portion 4A, and
first shoulder sipes 5B respectively extending from the axially inner ends 5e of the shoulder lug grooves 5A to the shoulder circumferential groove 3A.

Further, the shoulder land portions 4A may be provided with
second shoulder sipes 5C crossing one of the shoulder land portions 4A, and
shoulder shallow grooves 5D intersecting the shoulder lug grooves 5A in the other of the shoulder land portions 4A, as in the example shown in FIG. 1.

The middle land portions 4B are each provided with first middle sipes 6A extending across the middle land portion 4B. Further, the middle land portions 4B may be provided with
second middle sipes 6B disposed in one of the middle land portions 4B, and extending axially inwardly from the shoulder circumferential groove 3A to terminate within the middle land portion 4B, and
third middle sipes 6C disposed in the other of the middle land portions 4B, and extending axially inwardly from the shoulder circumferential groove 3A to join together with the respective first middle sipes 6A, as in the example shown in FIG. 1.

The crown land portion 4C is provided with first crown sipes 7A and second crown sipes 7B.

The first crown sipes 7A extend from one of the crown circumferential grooves 3B (left side in the figure) toward the other of the crown circumferential grooves 3B (right side in the figure) beyond the tire equator C and terminate within the crown land portion 4C, and
the second crown sipes 7B extend from the other of the crown circumferential grooves 3B toward one of the crown circumferential grooves 3B and terminate within the crown land portion 4C without extending across the tire equator C.

The circumferential grooves 3 in the present embodiment are formed as straight grooves in order that water can flow smoothly to provide excellent drainage performance. However, the circumferential grooves 3 may be wavy or zigzag grooves, or a combination of a straight groove(s) and a wavy or zigzag groove(s).

Thus, the design and configuration of the shoulder land portions 4A, the middle land portions 4B and the crown land portion 4C are not limited to the illustrated example shown in FIG. 1 and can be changed variously.

The circumferential groove 3 has a groove bottom 11 defining the deepest portion of the groove, and a pair of groove side walls 12 extending from the groove bottom 11 towards the tread surface 2a of the tread portion 2.

In this application, the groove side walls 12 of one of the shoulder circumferential grooves 3A (left side in the figure) are denoted by 12a and 12b,
the groove side walls 12 of the other of the shoulder circumferential grooves 3A (right side in the figure) are denoted by 12c and 12d,
the groove side walls 12 of one of the crown circumferential grooves 3B are denoted by 12e and 12f, and
the groove side walls 12 of the other of the crown circumferential grooves 3B are denoted by 12g and 12h.

Figure 2:
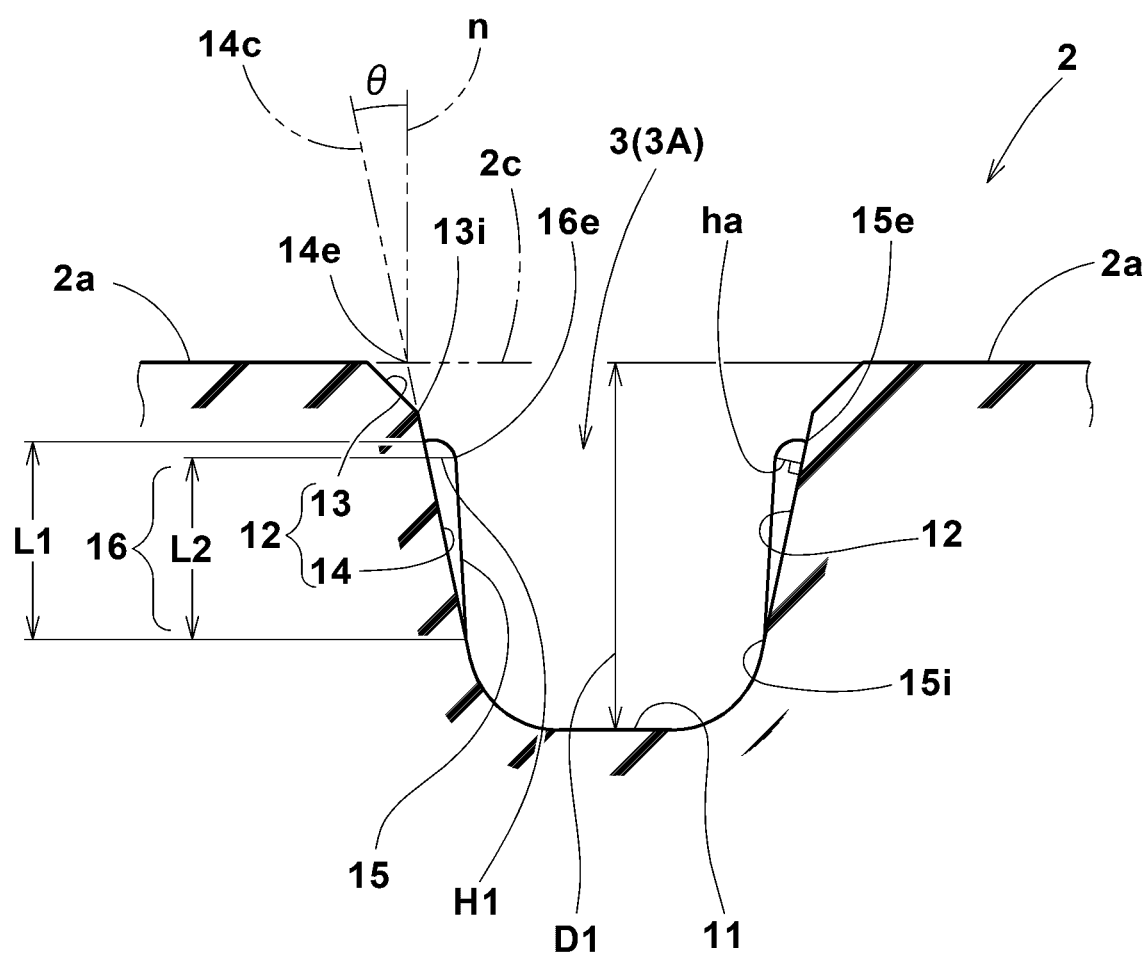
FIG. 2 is a cross-sectional view of a circumferential groove thereof.

FIG. 2 is a cross-sectional view of the circumferential groove 3 perpendicular to the longitudinal direction of the circumferential groove 3. As shown, the groove side walls 12 of the present embodiment are extended to the tread surface 2a of the tread portion 2. In the present embodiment, each of the groove side walls 12 comprises
a radially outer portion 13 extending radially inwardly from the tread surface 2a with a gentle slope angle, and
a radially inner portion 14 extending from the radially inner end 13i of the outer portion 13 toward the groove bottom 11 with a steep slope angle.

Figure 3:
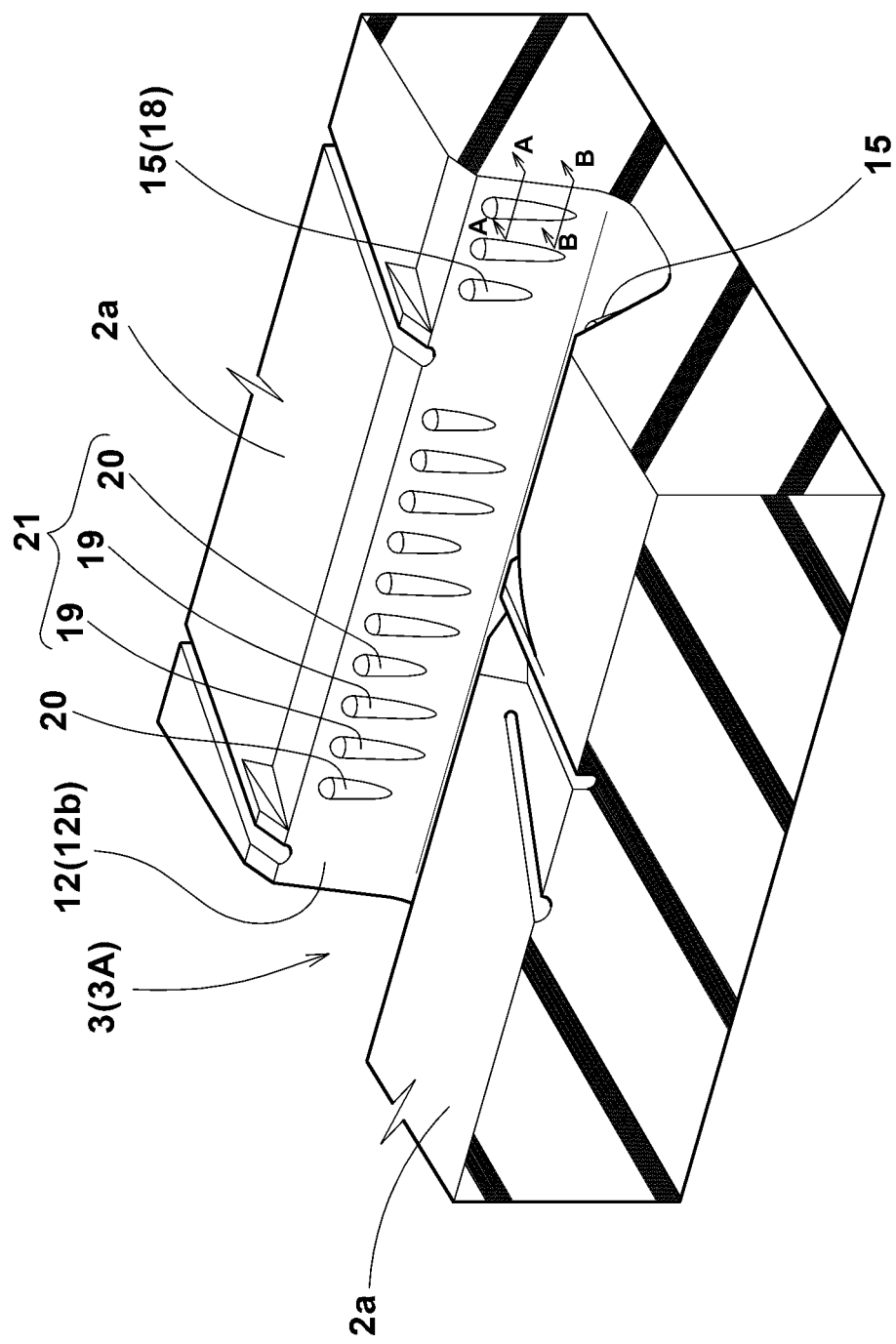
FIG. 3 is a perspective partial view of the circumferential groove shown in FIG. 1.

According to the present invention, at least one of the groove side walls 12 is provided with protrusions 15 protruding into the groove and arranged in the tire circumferential direction as shown in FIG. 3.
such protrusions 15 facilitate causing turbulence to water flowing in the circumferential groove 3 and thereby facilitate separation of the water from the groove side wall 12. Further, the protrusions 15 act as a resistance against air flowing in the circumferential groove 3 and can reduce the air tube resonance sound. Accordingly, the tire 1 of the present embodiment exhibits superior drainage performance and noise performance.

In the present embodiment, as shown in FIG. 1, the protrusions 15 are provided on all of the groove side walls 12a to 12h of the shoulder circumferential grooves 3A and the crown circumferential grooves 3B.

Hereinafter, the protrusions 15 disposed in the groove side wall 12b of one of the shoulder circumferential grooves 3A are described. But, the description is applied to the protrusions 15 disposed in the other groove side walls 12.

Figure 4A:
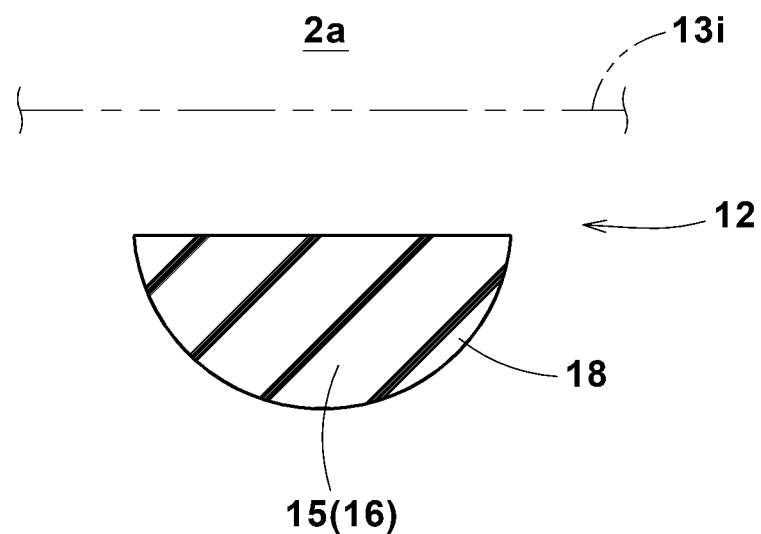
FIG. 4($a$) is a cross sectional view of a protrusion taken along line A-A of FIG. 3.
Figure 4B:
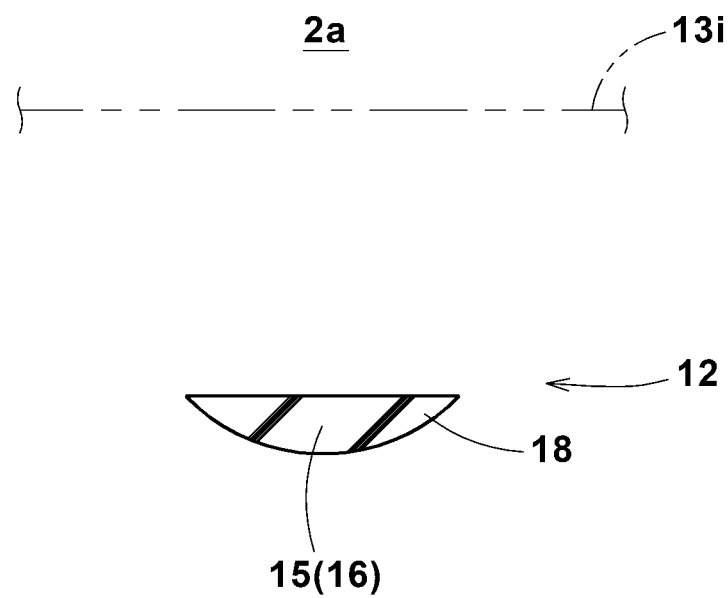

FIG. 4(a) is a cross sectional view of a protrusion 15 taken along line A-A in FIG. 3. FIG. 4(b) is a cross sectional view of the same protrusion 15 taken along line B-B in FIG. 3. The protrusion 15 has a radially extending section 16 in which the cross section of the protrusion 15 taken in parallel with the tread surface 2a is gradually increased toward the radially outer side of the tire (hereinafter, the gradually increasing section 16).
when demolding the vulcanized tire 1 from the vulcanization mold, owing to the gradually increasing section 16,
radial grooves provided on the vulcanization mold (not shown) for forming the protrusions 15 can be smoothly separated from the rubber of the groove side walls, and
the occurrence of damages such as scratching and tearing of the groove side wall can be prevented.
on the other hand, as the tread wear progresses, the volume of the circumferential groove is decreased. But, the gradually increasing section 16 decreases, namely, the occupation decreases. Thereby, in the early stage of tread wear life where the volume of the circumferential groove 3 is large, the protrusions 15 effectively suppress the air tube resonance sound. In the terminal stage of tread wear life where the volume of the circumferential groove 3 is small, the resistance of the protrusions 15 to the water flow becomes small. Thus, the drainage performance, the noise performance and the demolding performance are improved.

In the present embodiment, as shown in FIG. 2, the gradually increasing section 16 is formed from a position on the radially inside of the radially outer end 15e of the protrusion 15 to the radially inner end 15i of the protrusion 15 in order to facilitate the separation of the vulcanization mold from the radially inner end portion of the protrusion 15, and thereby to further improve the demolding performance.

Each of the protrusions 15 comprises a section 17 from the radially outer end 15e of the protrusion 15 to the radially outer end 16e of the gradually increasing section 16, in which the cross section of the protrusion 15 taken in parallel with the tread surface 2a is gradually decreased toward the radially outer side of the tire (hereinafter, the gradually decreasing section 17). Thereby, the separation of the vulcanization mold from the radially outer end portion of the protrusion 15 is facilitated to further improve the demolding performance.

In order to effectively derive the advantages effects described above, the radial height L2 of the gradually increasing section 16 is preferably not less than 50%, more preferably not less than 70%, but preferably not more than 98%, more preferably not more than 95% of the radial height L1 of the protrusion 15.

The protrusions 15 include a protrusion 18 of which cross section is semicircular as shown in FIG. 4(a). Therefore, the radial groove of the vulcanization mold for forming the semicircular protrusion 18 can be separated more smoothly from the rubber, and the demolding performance is improved. Further, as the air flow in the circumferential groove 3 is reflected in various directions, the noise performance is improved.
In the present embodiment, each of the protrusions 15 is the protrusion 18 of which cross section is semicircular from the radially inner end 15i to the radially outer end 15e. As a result, the gradually increasing section 16 has a semi-conical shape.

Figure 5:
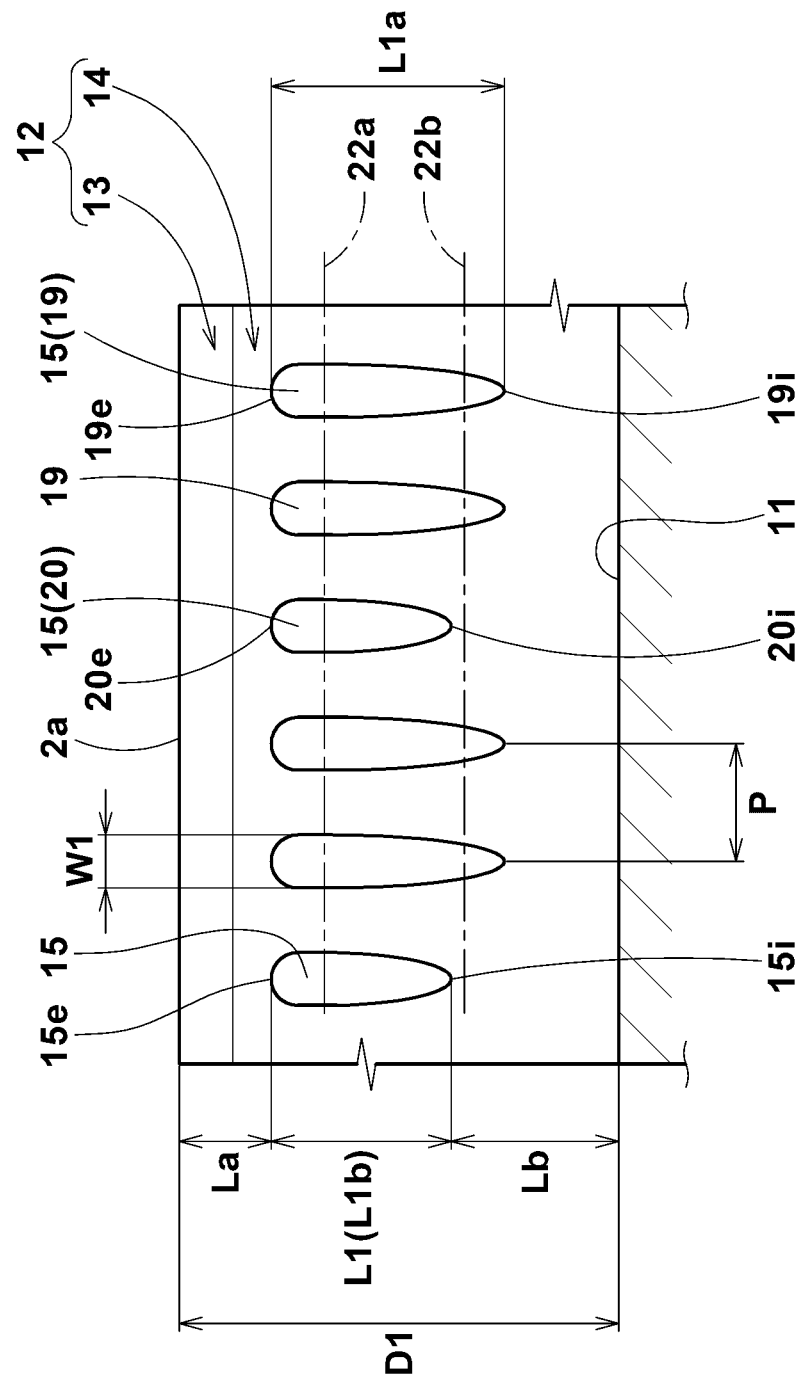
FIG. 5 is a partial view of a side wall of the circumferential groove showing the protrusions.

As shown in FIG. 5, the radial distance La between the radially outer end 15e and the tread surface 2a is preferably set in a range from 6% to 36% of the groove depth D1 of the circumferential groove 3.
If the distance La is less than 6% of the groove depth D1, the volume of the protrusion 15 becomes excessively large, and the water flow in the grooves 3 may be reduced and the drainage performance deteriorates. If the distance La is more than 36% of the groove depth D1, as the volume of the protrusion 15 is reduced, it becomes difficult to reduce the air tube resonance sound, and also it becomes difficult to separate the water from the groove side wall 12 by the turbulence.

In order to effectively derive the advantageous effects as described above, the radial distance Lb between the radially inner end 15i of the protrusion 15 and the groove bottom 11 is preferably set in a range from 7% to 40% of the groove depth D1 of the circumferential groove 3.

In the present embodiment, as shown in FIG. 2, the protrusions 15 are disposed in the above-mentioned radially inner portion 14 of the groove side wall 12 having a steep slope angle. Accordingly, the radially outer ends 15e of the protrusions 15 are not formed in the radially outer portion 13 having a gentle slope. As a result, the demolding performance is improved. From this point of view, the steep slope angle θ of the radially inner portion 14 is preferably set in a range from 5 to 15 degrees.
In the cross section of the circumferential groove 3 perpendicular to the longitudinal direction of the circumferential groove 3, the steep slope angle θ of the radially inner portion 14 is the angle with respect to a normal direction (n) to the tread surface 2a, in particular, a direction normal to a virtual line 2c drawn between the groove edges as shown in FIG. 2. Further, the inclination angle of the ridge of the gradually increasing section 16 of each protrusion 15 on each groove side wall 12 is set in a range between the slope angle θ and zero as shown in FIG. 2.

The protrusion 15 has a maximum width W1 in the tire circumferential direction at the radially outer end 16e of the gradually increasing section 16 as shown in FIG. 5.
The protrusion 15 has a maximum protruding amount H1 in the groove width direction at the radially outer end 16e of the gradually increasing section 16 as shown in FIG. 5.
Preferably, the maximum protruding amount H1 is larger than the maximum width W1. Thereby, the turbulence of water flowing in the groove becomes likely to occur, and the resistance to air flow is increased. Thus, the effect to reduce the air tube resonance sound and the effect to separate the water flow from the groove side wall are improved.

As shown in FIG. 5, the pitch P in the tire circumferential direction of the protrusions 15 is preferably set in a range from 1.5 to 4 times the maximum width W1 of the protrusions 15.
If the pitch P is less than 1.5 times the maximum width W1, there is a possibility that the volume of the circumferential groove 3 becomes smaller, and the drainage resistance becomes increased. If the pitch P is more than 4 times the maximum width W1, there is a possibility that the effect to generate the turbulence and the effect to reduce the air tube resonance sound are decreased.

In order to effectively derive the advantageous effects described above, the maximum height ha of the protrusion 15 measured in the normal direction to the groove side wall 12 as shown in FIG. 2 is preferably set in a range from 0.3 to 1.5 mm.

The protrusions 15 include a major protrusion 19 whose radial length is larger, and a minor protrusion 20 whose radial length is smaller than that of the major protrusion 19. Accordingly, the groove side wall 12 is, in the tire radial direction, provided with a first region 22a where the major protrusions 19 and the minor protrusions 20 exist, and a second region 22b where only the major protrusions 19 exist.

In the present embodiment, the first region 22a is positioned on the radially outside of the second region 22b.

Such arrangement furthers the occurrence of the turbulence, and the noise performance is improved.

Further, as the radial positions of the ends 15i, 15e of the protrusions 15 are dispersed, the force resisting the demolding is also dispersed, and the demolding performance can be further improved.

On at least one side in the tire circumferential direction of the major protrusion 19, the minor protrusion 20 is disposed adjacently thereto. On at least the above-said one side in the tire circumferential direction of the minor protrusion 20, the major protrusion 19 is disposed adjacently thereto. Thus, the effect described above is effectively exhibited.

In the present embodiment, two major protrusions 19 alternate with one minor protrusion 20. In other words, a unit consisting of two successive major protrusions 19 and one minor protrusion 20 is repeated in the tire circumferential direction. Aside from this arrangement, in the present invention, various arrangements may be possible, for example, one major protrusion 19 alternates with two minor protrusion 20, and one major protrusion 19 alternates with one minor protrusion 20.

In the present embodiment, the distance in the tire circumferential direction
from each of positions in the tire circumferential direction of the groove side wall 12 at which the sipes (5B, 6A, 6B, 7A, 7B) communicate with the circumferential groove 3
to the protrusion 15 adjacent thereto is preferably larger than the pitch P.

However, it may be possible to arrange the protrusions 15 at the pitch P successively in the tire circumferential direction.

In the present embodiment, the radially outer ends 20e of the minor protrusions 20 and the radially outer ends 19e of the major protrusions 19 are positioned at the same height in the tire radial direction as shown in FIG. 5. Accordingly, the radially inner ends 20i of the minor protrusions 20 are positioned at a different radial height than the radially inner ends 19i of the major protrusions 19.

Thus, as described above, the force from the inner ends 19i and 20i resisting the demolding is dispersed, and the demolding performance can be further improved.

In order to effectively derive this advantageous effect, it is preferable that the radial length L1a of the major protrusions 19 is set in a range from 1.2 to 1.8 times the radial length L1b of the minor protrusions 20.

If the radial length L1a is more than 1.8 times the radial length L1b, there is a possibility that the rigidity of the minor protrusion 20 becomes insufficient.

Figure 6:
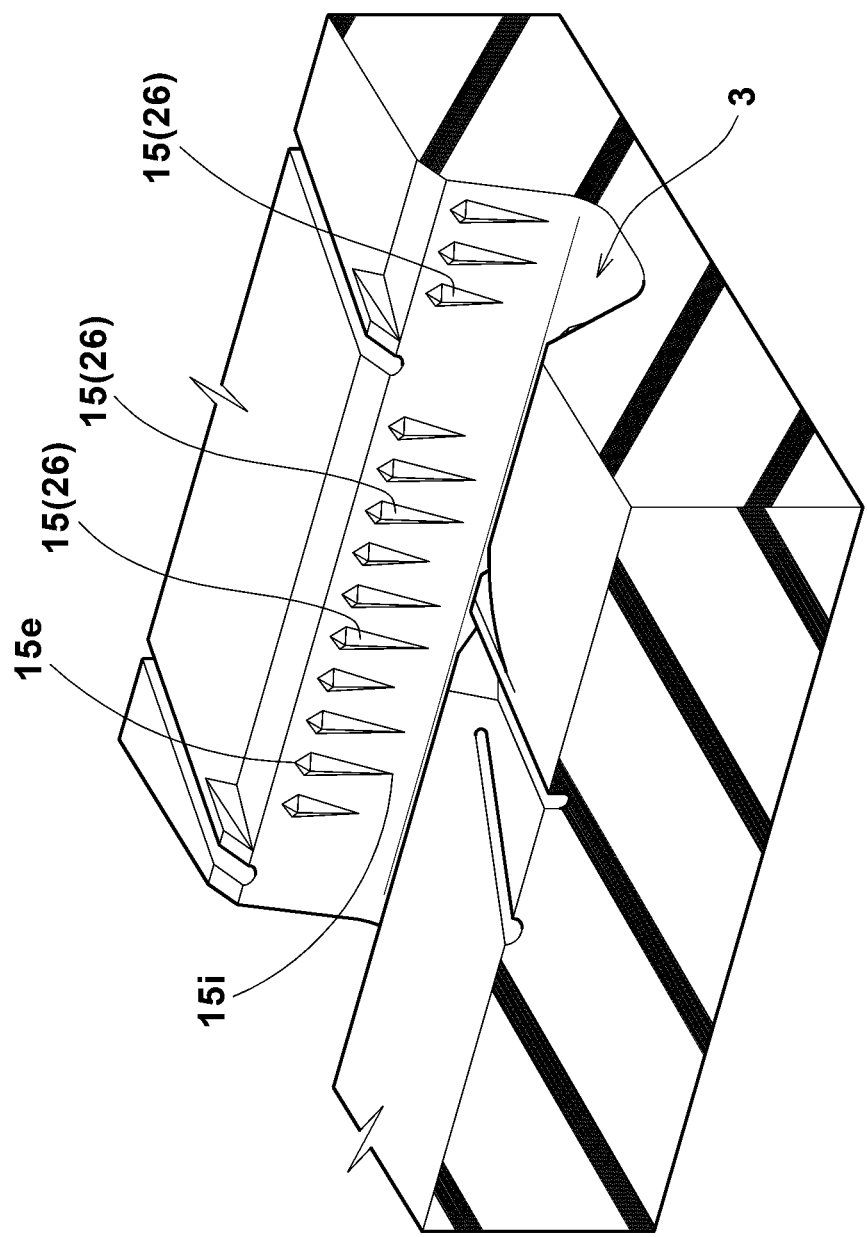
FIG. 6 is a perspective partial view of the circumferential groove showing another example of the protrusion.

FIG. 6 shows a triangular protrusion 26 as another example of the protrusion 15. The cross section of the triangular protrusion 26 in parallel with the tread surface 2a has a triangular shape continuously from the radially inner end 15i to the radially outer end 15e of the radially outer end 15e. Other than the triangular cross section, the description made on the former example can be applied herein.

In this example, the gradually increasing section of the triangular protrusion 26 is formed in the form of a semi-triangular pyramid.

If the maximum protruding amount H1 and the maximum width W1 are the same, the surface area of the triangular protrusion 26 becomes smaller than the semi-circular protrusion 18, and the demolding performance is further improved.

As described above, in the present embodiment, each of the groove side walls 12a-12h is provided with the protrusions 15. But, according to the present invention, the protrusions 15 can be provided on some of the groove side walls 12a-12h. Further, according to the present invention, the protrusions 15 on each groove side wall 12 can be the semi-circular protrusions 18, or the triangular protrusions 26, or a combination of the semi-circular protrusions 18 and the triangular protrusions 26. Furthermore, according to the present invention, it is possible that the semi-circular protrusions 18 are provided on some of the groove side walls 12a-12h, and the triangular protrusions 26 are provided on the rest of the groove side walls 12a-12h.

While detailed description has been made of especially preferable embodiments of the present invention, the present invention can be embodied in various forms without being limited to the illustrated embodiments.

Comparison Tests

Based on the tread pattern shown in FIG. 1, pneumatic tires of size 215/60R16 were experimentally manufactured as test tires Ref and Ex1-Ex15.

In the test tire Ref (Comparative example), according to the above-mentioned Patent Document 1, the groove side walls 12 were provided with rectangle radial grooves instead of the protrusions 15, wherein the rectangle radial grooves had a constant depth corresponding to the maximum height ha, a constant width corresponding to the maximum width W1, and a radial length corresponding to the radial length L1a of major protrusion 19.

In the test tires Ex1-Ex15, specifications of the protrusions were changed as shown in Table 1.

The test tires were tested for the demolding performance, drainage performance and noise performance as follows.

<Demolding Performance Test>

The side walls of the circumferential grooves of each test tire were visually checked for damages caused during demolding the vulcanized tire from the mold. The results are indicated in Table 1 by an index based on comparative example (Ref) being 100, wherein the larger value is better.

<Drainage Performance Test>

The test tires were mounted on all wheels (Rim size 18×8.0 J) of a 2500 cc passenger car and inflated to 230 kPa. The test car was run on a wet road surface of a test course covered with water of about 3 mm depth, and the test driver evaluated the drainage performance (wet performance) based on cornering performance, traction performance, and braking performance.

The results are indicated in Table 1 by an index based on Comparative example (Ref) being 100, wherein the larger value is better.

<Noise Performance Test>

According to ECE R117, the above-mentioned test car was coasted at a speed of 60 km/h in a straight test course, and the maximum noise sound level was measured with a microphone set at 1.2 meter height from the road surface and 7.5 meter sideways from the running center line. The results are indicated in Table 1 by an index based on Comparative example (Ref) being 100, wherein the larger value is better.

TABLE 1

|  | Tire | | | | | | | | | | | | | | | |
|---|---|---|---|---|---|---|---|---|---|---|---|---|---|---|---|---|
|  | Ref | Ex1 | Ex2 | Ex3 | Ex4 | Ex5 | Ex6 | Ex7 | Ex8 | Ex9 | Ex10 | Ex11 | Ex12 | Ex13 | Ex14 | Ex15 |
| Groove side walls(FIG. No) | — | 3 | 3 | 3 | 3 | 3 | 3 | 3 | 3 | 3 | 3 | 3 | 3 | 3 | 3 | 6 |
| slope angle θ(deg.) | 0 | 9 | 9 | 9 | 9 | 9 | 9 | 9 | 9 | 9 | 9 | 9 | 9 | 9 | 9 | 9 |
| Protrusions | | | | | | | | | | | | | | | | |
| max. height ha(mm) | 0.6 | 0.6 | 0.6 | 0.6 | 0.6 | 0.6 | 0.2 | 0.3 | 1.5 | 1.8 | 1.8 | 1.8 | 1.8 | 1.8 | 0.6 | 0.6 |
| max. width W1(mm) | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| pitch P/max. width W1 | 2 | 2 | 2 | 2 | 2 | 2 | 2 | 2 | 2 | 2 | 1.3 | 1.5 | 4 | 4.3 | 2 | 2 |
| Major protrusions | | | | | | | | | | | | | | | | |
| distance La/depth D1(%) | 20 | 20 | 20 | 20 | 20 | 20 | 20 | 20 | 20 | 20 | 20 | 20 | 20 | 20 | 20 | 20 |
| distance Lb/depth D1(%) | 24 | 24 | 24 | 24 | 24 | 24 | 24 | 24 | 24 | 24 | 24 | 24 | 24 | 24 | 24 | 24 |
| Minor protrusion *1 | A | P | P | P | P | P | P | P | P | P | P | P | P | P | A | P |
| Length ratio L1a/L1b | 1.0 | 1.1 | 1.2 | 1.7 | 1.8 | 2.0 | 1.7 | 1.7 | 1.7 | 1.7 | 1.7 | 1.7 | 1.7 | 1.7 | 1.0 | 1.7 |
| Demolding | 100 | 108 | 114 | 120 | 116 | 110 | 124 | 123 | 110 | 108 | 110 | 113 | 120 | 122 | 114 | 122 |
| Drainage | 100 | 100 | 102 | 105 | 101 | 100 | 100 | 102 | 104 | 102 | 102 | 104 | 102 | 100 | 108 | 104 |
| Noise | 100 | 105 | 107 | 110 | 106 | 103 | 100 | 103 | 107 | 107 | 107 | 108 | 104 | 100 | 107 | 108 |

*1 (P)resence or (A)bsence of minor protrusions

From the test results, it was confirmed that, according to the present invention, the drainage performance, noise performance and demolding performance can be improved.

DESCRIPTION OF THE REFERENCE SIGNS 1 tire
2 tread portion
2a tread surface
3 circumferential groove
11 circumferential groove's bottom
12 circumferential groove's side wall
16 gradually increasing section

The invention claimed is:

1. A tire comprising:
a tread portion provided in the tread surface with a circumferentially continuously extending circumferential groove having a bottom and a pair of opposite side walls, wherein
at least one of the side walls is provided with protrusions protruding into the circumferential groove and arranged in in a tire circumferential direction,
each of the protrusions has a gradually increasing part in which an area of a cross section of each protrusion being parallel with the tread surface is gradually increased toward a radially outer side of the tire,
the circumferential groove is a straight groove, and
the protrusions include a major protrusion having a radial length, and a minor protrusion whose radial length is smaller than the radial length of the major protrusion, and the major protrusion and the minor protrusion are alternately arranged in the tire circumferential direction.

2. The tire according to claim 1, wherein
the protrusions include at least one protrusion whose cross section in parallel with the tread surface has a semicircular shape.

3. The tire according to claim 1, wherein
the protrusions include at least one protrusion whose cross section in parallel with the tread surface has a triangular shape.

4. The tire according to claim 1, wherein
in the cross section of each protrusion, a maximum amount of the protruding in a widthwise direction of the groove is greater than a maximum width in the tire circumferential direction.

5. The tire according to claim 1, wherein
radial distances from the tread surface to radially outer ends of the protrusions are 6% to 36% of the depth of the circumferential groove.

6. The tire according to claim 1, wherein
radial distances from a groove bottom of the circumferential groove to radially inner ends of the protrusions are 7% to 40% of the groove depth of the circumferential groove.

7. The tire according to claim 1, wherein
on at least one side in the tire circumferential direction of the major protrusion, the minor protrusion is disposed adjacently thereto, and on at least one side in the tire circumferential direction of the minor protrusion, the major protrusion is disposed adjacently thereto.

8. The tire according to claim 1, wherein
the radial length of the major protrusion is 1.2 to 1.8 times the radial length of the minor protrusion.

9. The tire according to claim 1, wherein
said cross section of each of the protrusions is a semicircular shape or a triangular shape.

10. The tire according to claim 2, wherein
in the cross section of each protrusion, a maximum amount of the protruding in the widthwise direction of the groove is greater than a maximum width in the tire circumferential direction.

11. The tire according to claim 3, wherein
in the cross section of each protrusion, a maximum amount of the protruding in the widthwise direction of the groove is greater than a maximum width in the tire circumferential direction.

12. The tire according to claim 1, wherein
the radial distances from the tread surface to radially outer ends of the protrusions are 6% to 36% of the depth of the circumferential groove, and
the radial distances from the groove bottom of the circumferential groove to the radially inner ends of the protrusions are 7% to 40% of the groove depth of the circumferential groove.

13. The tire according to claim 1, wherein
radially outer ends of the minor protrusions and radially outer ends of the major protrusions are positioned at a same radial height, whereby radially inner ends of the minor protrusions are positioned at a different radial height than radially inner ends of the major protrusions.

14. The tire according to claim 1, wherein
in each of the protrusions, a radial dimension of the gradually increasing part is not less than 50% of a radial dimension of the protrusion, and each protrusion has a part between a radially outer end of the protrusion and a radially outer end of its gradually increasing part in which the area of the cross section of each protrusion being parallel with the tread surface is gradually decreased radially outwardly.

* * * * *